United States Patent
Judd et al.

[15] 3,660,753
[45] May 2, 1972

[54] SELF-OSCILLATING SWITCHING REGULATOR WITH FREQUENCY REGULATION THROUGH HYSTERETIC CONTROL OF THE SWITCHING CONTROL TRIGGER CIRCUIT

[72] Inventors: Frank Fuller Judd, Madison; Jan Mark Lieberman, Lake Hiawatha; Helmut Wilhart, Whippany, all of N.J.

[73] Assignee: Bell Telephone Laboratories, Incorporated, Murray Hill, N.J.

[22] Filed: Dec. 21, 1970

[21] Appl. No.: 100,148

[52] U.S. Cl. ................................ 323/22 T, 321/2, 323/38, 323/DIG. 1
[51] Int. Cl. ........................................................ G05f 1/56
[58] Field of Search ............... 321/2; 323/4, 17, 22 T, 38, 323/DIG. 1

[56] References Cited

UNITED STATES PATENTS

| 3,437,912 | 4/1969 | Morris | 323/22 T |
| 3,378,758 | 4/1968 | Goodenow | 323/DIG. 1 |
| 3,368,139 | 2/1968 | Wuerflein | 323/22 T |

*Primary Examiner*—A. D. Pellinen
*Attorney*—R. J. Guenther and E. W. Adams, Jr.

[57] ABSTRACT

A self-oscillating switching mode regulator is frequency regulated by directly controlling the hysteresis of the switching control circuit in the voltage control feedback loop. The switching control circuit includes a hysteretic bistable trigger circuit whose hysteresis width defined by its upper and lower triggering levels may be widened or narrowed about some mean signal level in response to a frequency error signal.

6 Claims, 5 Drawing Figures

PATENTED MAY 2 1972 3,660,753
SHEET 1 OF 3
PRIOR ART *FIG. 1*
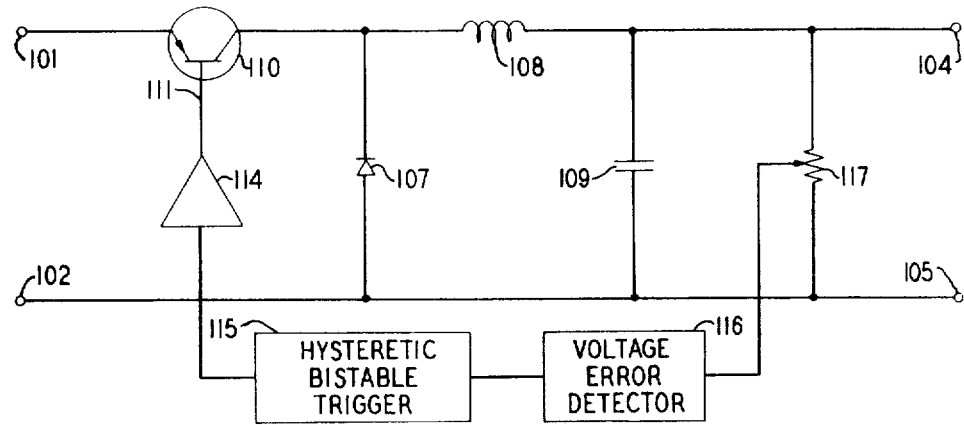
*FIG. 2*
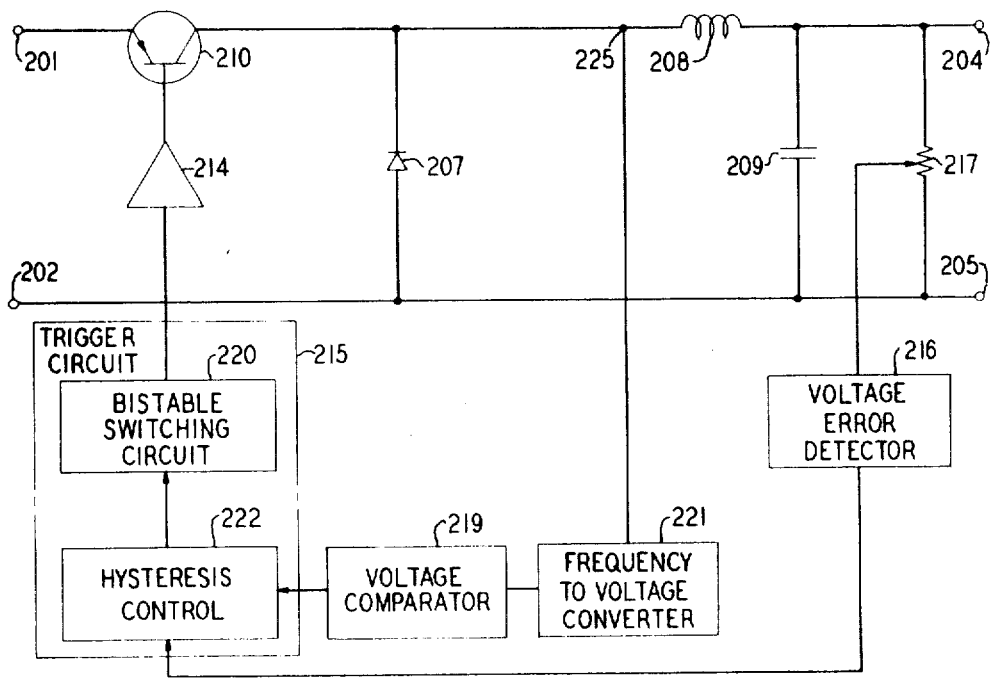
INVENTORS F. F. JUDD
J. M. LIEBERMAN
H. WILHART
BY Alfred J. Steinmetz
ATTORNEY

SELF-OSCILLATING SWITCHING REGULATOR WITH FREQUENCY REGULATION THROUGH HYSTERETIC CONTROL OF THE SWITCHING CONTROL TRIGGER CIRCUIT

BACKGROUND OF THE INVENTION

This invention relates to switching mode voltage regulators. It is specifically concerned with the self-oscillating type switching regulator and relates more particularly to the regulation of the frequency of operation of the switching regulator.

Switching mode regulators operate by transmitting pulses of energy from a source of continuous energy to an output terminal via a switching device. The voltage level appearing at the output terminal is regulated by comparing it to a reference signal. An error signal is generated in response to this comparison and utilized to control the switching device transmitting the pulses of energy.

Switching mode regulators may be driven or self-oscillating. The driven regulator transmits the pulses of energy at a fixed frequency. This fixed frequency is controlled by a discrete frequency source. The driven switching regulator is stable with respect to frequency, but its response to changes in the output voltage level may be delayed since there may be a loss of regulation control during a portion of each switching cycle.

The self-oscillating switching mode regulator inherently counteracts excursions of the output voltage beyond specified levels. A typical self-oscillating switching mode voltage regulator shown in FIG. 1 has a series switching transistor 110 and a filter consisting of inductor 108 and capacitor 109 inserted between an input terminal 101, to which power is applied, and an output terminal 104, to which a load is connected. The series switching transistor 110 is controlled so that it transmits energy whenever the voltage at terminal 104 drops below a specified level. The transmission of energy through transistor 110 is inhibited when the voltage at the output terminal 104 rises above another specified level. The voltage difference between these two specified levels is the system hysteresis of the switching mode regulator.

The control circuitry utilized to control the switching of the switching transistor 110 includes a potentiometer 117 coupled across the output terminals 104 and 105. A voltage proportional to the voltage across the output terminals 104 and 105 is transmitted from the wiper arm of the potentiometer 117 to a voltage error detector circuit 116. The voltage error detector circuit 116 comprises a source of reference voltage and a comparison circuit which generates a signal proportional to the difference between the reference voltage and the voltage at the wiper arm of the potentiometer 117. This error signal proportional to the output voltage is applied to a hysteretic bistable trigger circuit 115 and determines its switching state.

The hysteretic bistable trigger circuit 115 has a hysteretic switching characteristic wherein the input signal threshold at which it switches into a high level output state is different from the input signal threshold at which it switches into a low level output state. This hysteresis property of the bistable trigger circuit is necessary in order to assure self-sustained oscillations of the switching regulator. The signal output of the bistable trigger circuit 115 is applied to an amplifier 114 and from thence to the base 111 of the switching transistor 110.

It is readily apparent from inspection of the circuit that as the output voltage rises in response to conduction of transistor 110, the error signal output of the voltage error detector 116 changes in magnitude until it reaches a threshold level at which the hysteretic bistable trigger circuit 115 is switched into a particular one of its two output states. The particular output state of the hysteretic bistable trigger circuit 115 is utilized to bias the switching transistor 110 into a nonconductive condition.

During the nonconducting period of transistor 110 the load current is supplied via the flyback diode 107 and the inductor 108 to the output load. As the current in inductor 108 decays and capacitor 109 discharges, the voltage across the output terminals 104 and 105 begins to decrease. As the output voltage decreases, the error signal output of the voltage error detector 116 changes in an opposite direction from its previous change. When this error signal crosses the other threshold level, the hysteretic bistable trigger circuit 115 switches into its other output voltage state biasing the switching transistor 110 into conduction again.

While this regulator circuit arrangement is fairly simple and reliable, its frequency of operation is unstable. For example, the switching frequency responds to changes in the input source voltage coupled to terminals 101 and 102 and to changes in the output load impedance coupled to output terminals 104 and 105. In addition, the frequency of operation is responsive to entrainment by some outside frequency source coupled to the regulator or by periodic signals which may be reflected from the output load connected to terminals 104 and 105.

It is therefore an object of the present invention to operate a self-oscillating type switching mode regulator at a constant frequency.

It is another object of the invention to directly control the system hysteresis of the voltage feedback control loop in a switching mode regulator.

SUMMARY OF THE INVENTION

In accord with the above objects, frequency regulation of a switching mode regulator is achieved by controlled hysteresis compensation in its voltage feedback loop. More specifically, the frequency of a self-oscillating switching mode voltage regulator is regulated by controlling the hysteresis of a trigger circuit included in the voltage control feedback loop of the regulator. The hysteresis of the trigger circuit is controlled by controlling the upper and lower triggering levels of the trigger circuit about some mean trigger signal level in response to a frequency error signal derived from a frequency-to-voltage converter. The converter applies a control voltage proportional to the operating frequency of the regulator to a comparator which generates a frequency error signal. The trigger circuit comprises a bistable switching circuit and a hysteresis control circuit at its input to control its triggering levels. This error signal is applied to the hysteresis control circuit which electronically adjusts the triggering levels of the trigger circuit in response thereto.

BRIEF DESCRIPTION OF THE DRAWINGS

The invention may be readily understood by reference to the following detailed description and the accompanying drawings wherein:

FIG. 1 is a combination block and schematic diagram of a typical self-oscillating switching mode regulator known in the prior art and which is described hereinabove;

FIG. 2 is a combination block and schematic diagram of a self-oscillating switching mode regulator with a frequency regulation feedback loop according to the principles of the invention;

DETAILED DESCRIPTION

Figure 3:
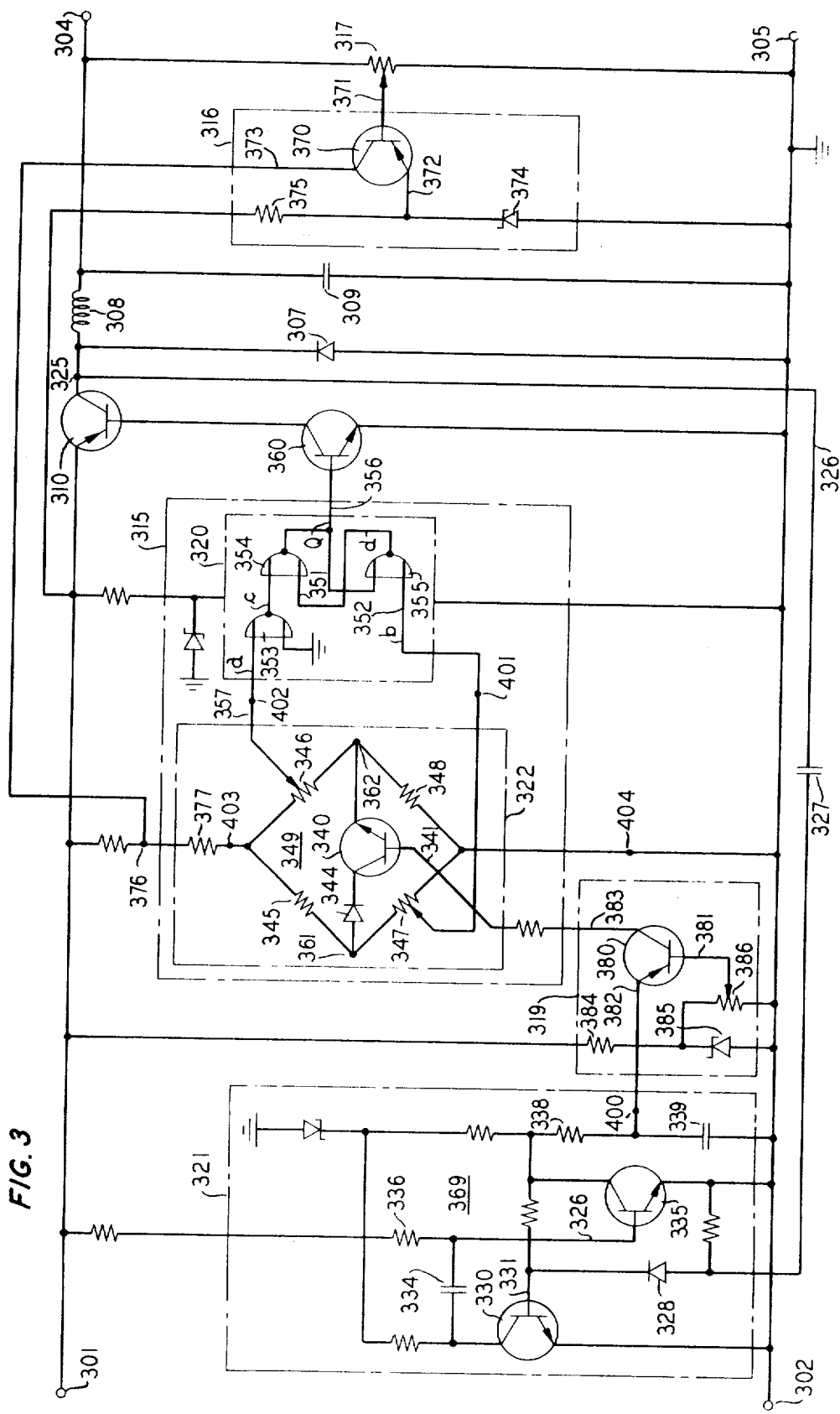
FIG. 3 is a detailed schematic diagram of a self-oscillating switching mode regulator with a frequency regulation feedback loop in accord with the principles of the invention.

The self-oscillating switching mode regulator disclosed in FIG. 2 operates in substantially the same manner as does the switching mode regulator shown in FIG. 1. The switching regulator disclosed in FIG. 2 has an added feedback loop to regulate the frequency of switching of the regulator. This added feedback loop includes a frequency-to-voltage converter 221, a voltage comparator 219, a hysteresis control circuit 222, and a bistable switching circuit 220. The hysteresis control circuit 222 and the bistable switching circuit 220 are combined to form the hysteretic bistable trigger circuit 215.

The frequency regulation loop is responsive to the switching frequency of the switching transistor 210 as detected by converter 221 at node 225. The frequency-to-voltage converter 221 in conjunction with a comparator 219 generates a frequency error signal which is proportional to the deviation of the switching frequency of transistor 210 from some desired operating frequency. This frequency error signal is applied to the hysteresis control circuit 222. The hysteresis control circuit 222 controls the hysteresis width defined by the upper and lower triggering levels at which the bistable circuit 215 changes state. If the switching frequency of transistor 210 increases above the regulated switching frequency, the hysteresis control circuit 222 widens the hysteresis width of the trigger circuit 215 by increasing the separation of the upper and lower triggering levels. This reduces the oscillating frequency of the voltage feedback loop, and hence reduces the switching frequency of the switching transistor 210 to its regulated switching frequency. Should the switching frequency of the switching transistor 210 drop below its regulated value, the separation between the upper and lower triggering levels of the trigger circuit 215 is decreased. This narrowing of the hysteresis width increases the switching frequency of the switching transistor 210 to its regulated value.

The frequency regulated switching mode regulator is shown in schematic form in FIG. 3. This embodiment of the regulator utilizes logic devices to construct the bistable switching portion 320 of the trigger circuit 315. The frequency-to-voltage converter 321 comprises a monostable multivibrator with an integrating network comprising resistor 338 and capacitor 339 to integrate its output. The hysteresis control circuit 322 comprises a bridge circuit 349 coupled to the input of the bistable switching circuit 320. The hysteresis control circuit 322 controls the separation of the upper and lower triggering levels of the bistable trigger circuit 315, which define its hysteresis width.

A thorough understanding of the invention may be readily acquired by describing a complete cycle of operation of the switching mode regulator disclosed in FIG. 3. Assume initially that the switching transistor 310 is beginning to conduct current. This current flows from an input source coupled to terminals 301 and 302 to an output load circuit coupled to the output terminals 304 and 305. In response to this increasing current flow, the voltage across the output terminals 30 and 305 increases in magnitude.

The magnitude of the output voltage is monitored by a voltage error detector circuit 316 which is coupled to a potentiometer 317 shunted across the output terminals 304 and 305. The voltage error detector circuit 316 comprises a voltage breakdown diode 374, a transistor 370, and a resistor 375. The breakdown diode 374 is energized by the input power source coupled to input terminals 301 and 302 which supplies power to the diode 374 via the resistor 375. The breakdown diode 374 provides a fixed reference voltage at the emitter 372 of transistor 370. A voltage proportional to the output voltage is applied, via potentiometer 317, to the base electrode 371 of the transistor 370. As the output voltage increases in magnitude, the transistor 370 is biased into a higher state of conduction.

The collector voltage of transistor 370 is coupled to the node 376 of the hysteresis control circuit 322. This node 376 is coupled, via resistor 377, to node 403 of the bridge circuit 349 of the hysteresis control circuit 322. The hysteresis control circuit 322 control the hysteresis width of the bistable trigger circuit 315. This control circuit 322 is described in detail below with reference to a description of the operation of the frequency regulation loop.

At this stage in the operating cycle the switching transistor 310 is biased into its saturated conducting condition by the conducting transistor 360. Transistor 360 is in turn biased into its conducting state by the high level output voltage of the bistable trigger circuit 315 applied to the base electrode 356.

The triggering input signals controlling the output state of the bistable switching circuit 320 are supplied, via the bridge circuit 349. The bridge circuit 349 comprises two opposed resistors 345 and 348 and two opposed potentiometers 346 and 347 in the alternate branches of the bridge. The resistances of the bridge 349 are selected so that the fraction of the feedback voltage at node 376 applied to terminal 357 of the switching circuit 320 is always higher than the fraction of the feedback voltage applied to terminal 352. In order to achieve this, the resistance of the potentiometers 346 and 347 is substantially larger than the resistance of the resistors 345 and 348.

As the output voltage across output terminals 304 and 305 continues to increase, the feedback voltage applied to the node 376 decreases due to the increased conductivity of transistor 370. The two input signals applied to terminals 352 and 357 decrease in magnitude. The signal on terminal 357, however, remains greater than the signal on terminal 352. The decreasing signal on terminal 352 is the first to drop below the input threshold level of the NOR gate 355 of the bistable switching circuit 320. The cross-coupling of NOR gates 354 and 355 is such that the voltage output at base lead 356 does not yet change state at this instant. The operation of the bistable switching circuit 320 is described in detail below in connection with a description of the frequency regulation loop.

As the output voltage continues to increase in magnitude the feedback voltage at the node 376 decreases to a point at which the input voltage applied to terminal 357 is low enough to trigger the bistable switching circuit 320 into changing its output state. At this point the voltage level at the base lead 356 switches into a low voltage state and the transistor 360 is biased into a nonconducting state, which in turn biases the switching transistor 310 into its nonconducting condition.

With the switching transistor 310 biased into its nonconducting condition, the output current to the load is supplied, via the flyback diode 307, the inductor 308 and the discharging of capacitor 309. As this inductance current decays and capacitor 309 discharges, the output voltage at terminals 304 and 305 begins to decrease. The conductivity of transistor 370 accordingly decreases and the feedback voltage supplied to the node 376 increases. When the output voltage decreases to a certain threshold voltage, the voltage applied to input terminal 352 of the bistable switching circuit 320 eventually reaches a threshold value high enough to switch the output signal at the base lead 356 to its high voltage level value. The high voltage lever at base lead 356 biases the transistor 360 and the switching transistor 310 into conduction again coupling the input voltage source through the filter comprising the inductor 308 and capacitor 309 to the output load connected to output terminals 304 and 305.

The frequency of operation of the voltage feedback loop of the switching regulator, as described above, is subject to many circuit parameters as well as outside influences such as variations in the input voltage or changes in the output load. In certain instances, the frequency of operation may be influenced by frequency entrainment to some outside signal source. In order to regulate the frequency and maintain stability of operation, a frequency control loop is included to regulate the frequency of operation of the regulator. This frequency control loop includes a frequency-to-voltage converter 321 coupled to node 325 at the output of the switching transistor 310, a voltage comparator 319, a hysteresis control circuit 322, and the bistable switching circuit 320.

The operation of the frequency control loop may be explained by describing its response to the switching of the switching transistor 310. Each time the switching transistor 310 switches into conduction, a pulse wavefront appears at node 325. This pulse wavefront is coupled, via lead 326 and the differentiating capacitor 327 which shapes it into a trigger signal, to the frequency-to-voltage converter 321. The frequency-to-voltage converter 321 includes a monostable multivibrator 369 comprising the cross-coupled transistors 330 and 335. The aforementioned trigger signal is coupled, via diode 328, to the base 331 of the normally nonconducting transistor 330. This trigger signal biases the transistor 330 into a saturated conducting state. The transistor 330, in its saturated conducting state, applies a voltage negative with respect to ground potential to the base 326 of the transistor 335, via the timing capacitor 334. The normally conducting transistor 335 is thereby biased into its nonconducting condition for a period of time determined by the time constant of resistor 336 and capacitor 334. This gives rise to a positive pulse at the collector of transistor 335.

An integrating network consisting of resistor 338 and capacitor 339 is coupled to the collector of transistor 335. It is apparent from the foregoing that the switching frequency of the switching transistor 310 controls the pulse repetition rate of the monostable multivibrator 369 and hence the average voltage across the capacitor 339. This voltage is therefore proportional to the switching frequency of the regulator.

The voltage across capacitor 339 is applied to a voltage comparator 319 which comprises a voltage breakdown diode 385, a transistor 380, a resistor 384, and a potentiometer 386. The potentiometer 386 allows application of an adjustable fraction of the breakdown voltage of diode 385 to base 381 of transistor 380. This permits adjustment of the frequency error voltage appearing at collector 383 of transistor 380, thereby furnishing a means for adjusting the switching frequency of the regulator. The frequency responsive voltage across capacitor 339 is applied to emitter 382 of transistor 380. The collector 383 of transistor 380 is connected to the base 341 of transistor 340 which is coupled across the two nodes 361 and 362 of the bridge circuit 349.

The frequency error voltage at the collector 383 of transistor 380 controls the conductivity of transistor 340. The conductivity of transistor 340 directly controls the hysteresis width or separation of the upper and lower triggering thresholds of the bistable trigger circuit 315. By adjusting the hysteresis width of the bistable trigger circuit 315, the frequency of operation of the regulator may be controlled. As described hereinabove, the resistance of the potentiometers 346 and 347 is larger than the resistance of the resistors 345 and 348. The wiper arms of the potentiometers 346 and 347 are adjusted to determine the initial hysteresis width by controlling the fractions of the voltage at node 376 which are applied to the terminals 352 and 357.

The transistor 340, whose conductivity is responsive to the frequency-to-voltage converter 321, via the comparator 319, controls the magnitude of the separation between the fractions of the feedback signal applied to node 376 which appear at the terminals 357 and 352. It is apparent that increasing the conductivity of transistor 340 will widen the hysteresis width. Decreasing the conductivity of transistor 340 will narrow the hysteresis width.

The bistable switching circuit 320 comprises two cross-coupled NOR gates 354 and 355 with a third NOR gate 353 included to invert the input to NOR gate 354. The operation of the bistable switching circuit 320 may be described in terms of its logic operations. The various terminals of the circuit are identified by lower case letters and the logic conditions of the terminals are indicated by the table of logic values below.

| State | Terminal a | b | c | d | Q |
|---|---|---|---|---|---|
| 1 | 0 | 0 | 1 | 1 | 0 |
| 2 | 1 | 0 | 0 | 1 | 0 |
| 3 | 1 | 1 | 0 | 0 | 1 (change of output state) |
| 4 | 1 | 0 | 0 | 0 | 1 |
| 5 | 0 | 0 | 1 | 1 | 0 (change of output state) |

Figure 5:
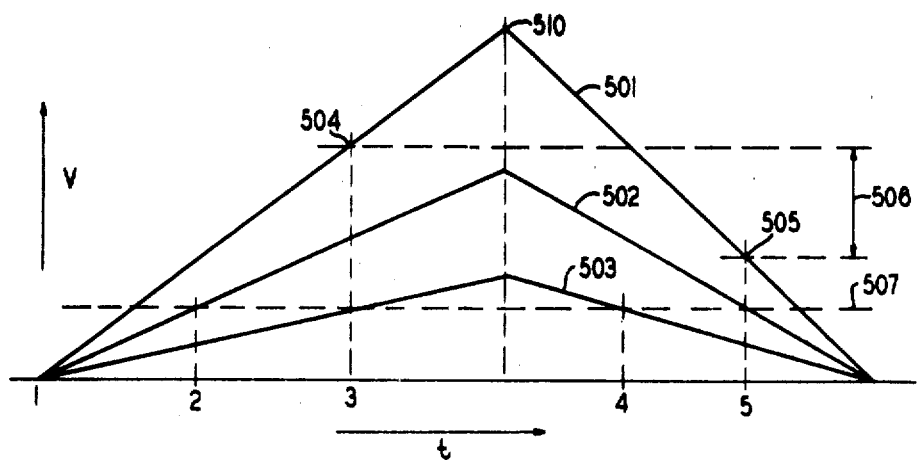
FIG. 5 is a voltage waveform diagram disclosing the response of the hysteretic bistable trigger circuit to a triangular waveform signal applied to its input terminal.

An understanding of the operation of the bistable switching circuit 320 may be acquired by correlating the states described in the table of logic values to the waveforms of the input signals shown in FIG. 5, wherein voltage is plotted versus time. The waveform 501 represents an example of a triangular feedback voltage. The waveform 502 represents the fraction of the triangular voltage appearing at the terminal 357. The waveform 503 represents the fraction of the triangular voltage appearing at the terminal 352. The voltage level 507 is the threshold voltage at which the NOR gates 353, 354 and 355 respond. The bistable trigger circuit 315 has a hysteretic trigger response as long as the voltage represented by waveform 502 is larger than the voltage represented by waveform 503.

Between states 1 and 2 the triangular voltage is increasing from its low value. The NOR gates 353 and 355 are not activated and the output Q of the bistable switching circuit 320 is at its low voltage output representative of a logic zero. As the triangular voltage increases, the corresponding voltages at terminals 357 and 352 increase as shown by waveforms 502 and 503, respectively. The waveform 502 reaches the operating threshold of NOR gate 353 at state 2. The trigger circuit does not yet change state and the output Q remains in its low voltage condition. The voltage 501 continues to increase and the voltage 503 eventually reaches the operating threshold of NOR gate 355. At this instant (state 3) the output states of NOR gates 355 and 354 change regeneratively, so that the output Q of the bistable switching circuit 320 assumes its high voltage level representative of a logic one.

The voltage 501 reaches its peak value 510 and begins to decline. The voltage 503 drops below the threshold of NOR gate 355 first but the bistable switching circuit 320 does not yet change state. The output Q switches regeneratively to its low level state, i.e., a logic zero, when waveform 502 drops below the threshold 507. It is apparent from the foregoing that by adjusting the fractional voltages 502 and 503 the hysteresis width 506 may be positively controlled. This hysteresis control regulates the switching frequency of the regulator.

Figure 4:
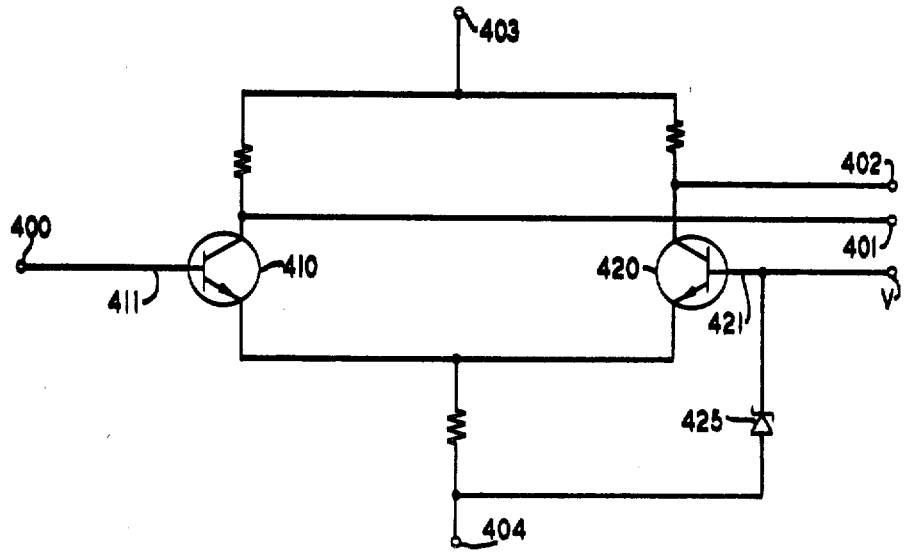
FIG. 4 is a schematic diagram of an electronic hysteresis control which may be utilized in the switching mode regulator disclosed in FIG. 3.

An alternative hysteresis control circuit which may be utilized in the present invention is disclosed in FIG. 4. The nodal points 400, 401, 402, 403 and 404 indicated in FIGS. 3 and 4 designate the terminals to which the hysteresis control circuit shown in FIG. 4 may be connected to and utilized in the regulator circuit in FIG. 3 with proper modifications to accomodate the changed voltage levels at terminals 401 and 402.

The hysteresis control circuit shown in FIG. 4 comprises two differentially coupled transistors 410 and 420. The base 421 of transistor 420 is at a reference potential established by the breakdown diode 425. The frequency responsive voltage generated by the monostable multi-vibrator 369 and integrated by resistor 338 and capacitor 339 is applied to the base 411 of transistor 410. It is apparent that the respective collector voltages of transistors 410 and 420, which establish the hysteresis width, will regulate the switching frequency of the regulator.

What is claimed is:

1. A self-oscillating switching regulator to derive a regulated voltage from an unregulated voltage source comprising
  an input and an output,
  a switching device coupling said input and output,
  a voltage regulation feedback loop to control said switching device, said voltage regulation loop including a bistable trigger circuit with hysteretic switching characteristics to sustain self-oscillations which drive said switching device,
  a frequency control reference voltage source,
  means to generate a frequency responsive voltage responsive to the switching frequency of said switching device,
  means to compare said responsive voltage and said reference voltage and derive an error voltage therefrom, and
  said bistable trigger circuit including a hysteresis control circuit to adjust its hysteretic trigger signal threshold response in response to said error voltage whereby the switching frequency of said switching device is maintained at a constant value.

2. A self-oscillating switching regulator in accord with claim 1 wherein said bistable trigger circuit includes a bistable switching circuit with two input leads whereby the respective magnitudes of the signal inputs to each lead determine the hysteresis of the overall trigger circuit, and said hysteresis control circuit comprises means to control the signal level applied to the said two input leads.

3. A self-oscillating switching regulator in accord with claim 2 wherein said means to generate a frequency responsive voltage includes a frequency-to-voltage converter and said hysteresis control circuit comprises two differentially coupled amplifying devices, one of said amplifying devices being responsive to the frequency-to-voltage converter and the other amplifying device being responsive to a reference voltage.

4. A self-oscillating switching regulator in accord with claim 2 wherein said hysteresis control circuit comprises a bridge circuit with four impedance branches, and a controlled resistance coupling two branch nodes of the bridge and responsive to said means to generate a frequency responsive voltage.

5. A self-oscillating switching regulator to derive a regulated output voltage from an unregulated voltage source comprising a switching device including a control electrode to control switching therein, a voltage regulating feedback loop coupled to said control electrode, a frequency regulating feedback loop including a hysteretic trigger circuit coupled to said control electrode and including a frequency-to-voltage converter responsive to the switching frequency of the switching regulator, a reference voltage source, voltage comparator means to compare the voltage of said converter and said reference voltage, and a hysteresis control circuit to electronically adjust the hysteresis of said trigger circuit in response to the output of said voltage comparator.

6. A self-oscillating switching regulator in accord with claim 5 wherein said hysteretic trigger circuit comprises a hysteresis control circuit, a bistable switching circuit, said hysteresis control circuit comprising means to derive two fractional level signals of different magnitudes from said feedback signals in said voltage regulating feedback loop in response to said voltage comparator, and said bistable switching circuit comprises cross-coupled logic NOR gates with a NOR logic gate as a first input to one of said cross-coupled gates and a second direct input to the other cross-coupled gate whereby the first and second fractional level signals are applied to the first and second inputs, respectively.

* * * * *